June 7, 1966 G. L. AHLSTEDT 3,254,525
PROCESSES AND APPARATUS FOR THE DETERMINATION OF DIMENSIONS,
CROSS-SECTIONAL DEVIATIONS, CURVATURE AND OTHER
IRREGULARITIES IN OBJECTS, PARTICULARLY
LOGS AND SAWN WOOD
Filed Sept. 3, 1963
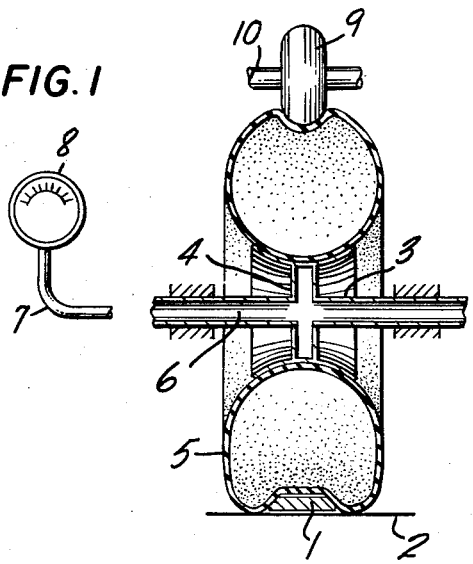
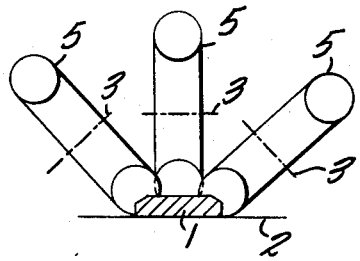
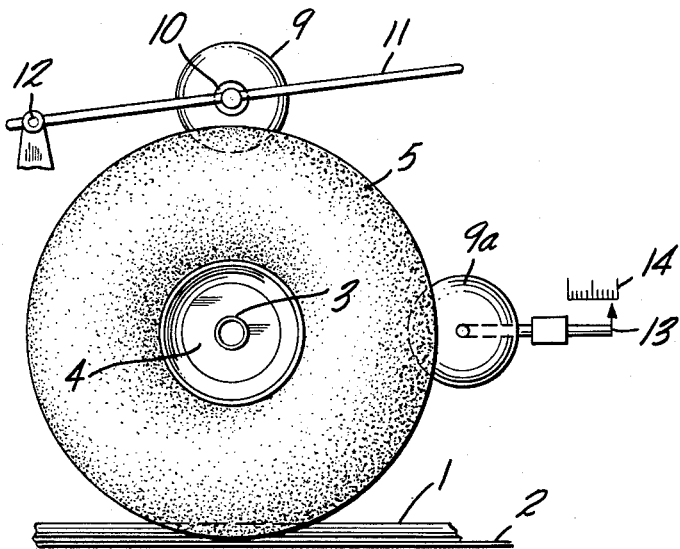

3,254,525
PROCESSES AND APPARATUS FOR THE DETERMINATION OF DIMENSIONS, CROSS-SECTIONAL DEVIATIONS, CURVATURE AND OTHER IRREGULARITIES IN OBJECTS, PARTICULARLY LOGS AND SAWN WOOD
Gunnar Lennart Ahlstedt, Ornskoldsvik, Sweden, assignor to Mo Och Domsjo Aktiebolag, Ornskoldsvik, Sweden, a joint-stock company of Sweden
Filed Sept. 3, 1963, Ser. No. 306,364
Claims priority, application Sweden, Sept. 3, 1962, 9,516
8 Claims. (Cl. 73—37.7)

The present invention relates to a process and an apparatus for the determination of dimensions, cross-sectional deviations, curvature and other irregularities in objects, particularly logs and swan wood.

The object of the invention is to provide a simple and reliable process and apparatus for solving this problem.

The essential features of the process are that the object to be examined is caused to perform a relative movement in relation to a deformable member filled with a compressible or displaceable fluid, such as a gas or a liquid, which member is in deformatory contact with the object, and that the pressure or volume changes, or the fluid displacement, caused by the object are determined.

The apparatus for carrying out the process comprises a fluid-filled deformable member and a base at a distance therefrom on which base the object to be examined can be placed and caused to perform a relative movement in relation of the said deformable member in deformatory contact with the same, said deformable member being combined with means for the determination of pressure or volume changes in the fluid, or of fluid displacement, caused by the object.

To avoid slipping between the object and the fluid-filled deformable member the latter can suitably be in the form of a closed tube of an elastic material, e.g. rubber, and be arranged on the circumference of a wheel which is rotatably mounted on a shaft, the elastic tube being connected, preferably through ducts in the wheel and the shaft, with a pressure gauge indicating the pressure changes (volume changes) caused by the object during its movement.

In some cases it may be possible to use a number of deformable members touching the object from different directions.

It the deformable member contains liquid which is displaced by the object to be examined, a riser tube may be connected to the member in question, in which tube the displaced liquid rises to different heights depending upon the variations in the object being examined.

The above-mentioned pressure gauges may also be replaced by feeler-members, such as swingably and rotatably mounted rollers resting with a certain pressure on the deformable member, e.g. the air-filled elastic tube, these feeler-members performing in the case of pressure changes in the deformable member a corresponding swinging movement which can serve as a measure of the variation in the object that caused said pressure change.

The pressure gauges and other devices for the determination of the pressure or volume changes, or of the fluid displacement, may, if desired, be of the recording type and/or may be arranged as to emit pulses for the remote control of classifying or processing machinery and possibly connected to a mechanical or electronic memory, a data machine etc.

Particularly when using air-filled or gas-filled deformable members upon which the barometric pressure and the atmospheric temperature have a certain influence, variations in the said factors may be compensated for, preferably automatically, for instance by controlling the pressure of the gas in the deformable member or by introducing suitable corrections in the indications or recordings obtained.

For a more detailed description of the invention reference is had to the accompanying drawing showing diagramatically some embodiments of the apparatus.

In the drawings:

FIG. 1 is an axial view of a first embodiment of the apparatus;

FIG. 2 is a side view of the same apparatus;

FIG. 3 shows a second embodiment of the apparatus.

A board, plank, piece of saw timber, log or similar 1 which is to be examined is placed on a base or a conveyor 2 which together with the board moves in the longitudinal direction of the latter, preferably at a constant speed.

Above the conveyor 2 on a shaft 3 which extends substantially at right angles to the direction of movement of the conveyor there is mounted a wheel 4 that peripherally carries an air-filled or gas-filled tube 5 of soft rubber or other elastic and easily deformable material.

The object 1 is so placed on the conveyor 2 that during the movement of the latter it will travel in under the rubber tube 5, as shown in FIG. 1, so that the tube will be deformed and its volume decreased.

The interior of the tube is connected to a pressure gauge 8 via the wheel 4, a duct 6 in the shaft 3 and a pipe 7.

As long as the cross section of the board or plank is the normal one the air or gas in the tube 5 due to the deformation thereof will be under a certain pressure which is indicated by the pressure gauge 8.

If, at some place along its length, the board or plank has a wane or narrows off, the elastic tube 5 will be less deformed and a lower pressure will be obtained which is shown by the gauge 8. Varying sizes of the wane produce varying readings on the gauge.

The gauge may, if desired, be constructed as a recording instrument indicating on a continuously moving tape the pressure variations caused by a number of boards, or planks, examined in succession, and thus providing a diagram according to which the sawn wood may be classified. It may also form a device for the remote control of classifying or processing machinery and can possibly be arranged to emit pulses or information to a mechanical or electronic memory, data machine etc. for further treatment of the measuring results.

If, instead of with air or gas, the tube 5 is filled with a liquid, such as water, a riser tube (not shown) may be connected to the pipe 7 instead of the gauge 8, in which tube the liquid rises to different heights depending upon the deformation of the elastic tube and thus upon the variations in the board or plank being examined.

In FIG. 1 there is shown at the top of the wheel also a roller 9 which is rotatably mounted on a pivot 10 and which runs against the periphery of the elastic tube 5. The pivot 10 is carried by an arm 11 which is swingably mounted at 12 (FIG. 2). Pressure changes in the medium contained in the elastic tube caused by variations in the cross section of a board or plank will cause the roller 9 to be raised or lowered and the arm 11 to be turned, and this movement can be utilized in a suitable manner, for instance to actuate a writing instrument or to control certain processes, such as for automatically classifying the sawn wood.

In FIG. 2 there is shown also another roller 9a lying against the periphery of the elastic tube 5 and actuating an instrument having a pointer 13 cooperating with a scale 14 on which the pressure changes can be read off.

In FIG. 3 there is shown an arrangement comprising three wheels provided with fluid-filled elastic tubes 5 contacting a board or plank 1 which moves on a base or table 2. The shafts 3 of the wheels form different angles with the table 2 and contact the board or plank from different directions, so that e.g. also curvature of the board can be determined with the guidance of the pressure changes occuring in the three elastic tubes during the movement of the board or plank.

As will be understood the process and apparatus according to the invention may be utilized for many and various purposes and e.g. also for determining the thickness of a work piece with plane and parallel sides as well as for determining of the breath and length of the work piece in which case the particular dimension of the object which it is desired to determine is allowed to cause the deformation of the deformable member.

What I claim is:

1. An apparatus for examining the surface of a body to determine the dimensions, cross-sectional deviations, external configuration, and like surface characteristics, comprising, in combination, a relatively elastic, fluid-filled, deformable member, capable of conforming closely to the external configuration of the body to be examined, means for rotatably supporting the deformable member and the body to be examined at a fixed distance from each other, whereby the body to be examined is in rolling deforming contact with the fluid-filled deformable member during the determination, and means for determining the change in condition of the fluid due to such deforming contact.

2. An apparatus in accordance with the claim 1 having a plurality of rotatable and deformable members for contact with the object to be examined from different sides.

3. An apparatus in accordance with claim 1, wherein the deformable member is in the form of an elastic tube, mounted on a rotatable wheel.

4. An apparatus in accordance with claim 3, wherein the means for determining change in condition of the fluid due to the deforming contact is connected to the deforming member via ducts in the wheel and the wheel shaft.

5. An apparatus in accordance with claim 1, wherein the means for determining the change in condition due to the deforming contact is a rotatably mounted feeler member adapted for rolling contact with the deformable member.

6. An apparatus in accordance with claim 1, wherein the means for determining the change in condition of the fluid due to the deforming contact is a pressure gauge.

7. An apparatus in accordance with claim 1, wherein the means for determining the change in condition of the fluid due to the deforming contact is a riser tube, in which the liquid rises to a height proportional to the deformation of the deformable member during contact with the body being measured.

8. An apparatus in accordance with claim 1, wherein the means for measuring the change in condition of the fluid due to the deforming contact is a recording instrument.

References Cited by the Examiner

UNITED STATES PATENTS

| 2,028,503 | 1/1936 | Doherty | 33—174 |
| 2,153,534 | 4/1939 | Faught | 33—147 X |
| 2,417,988 | 3/1947 | Mooney | 73—37 |
| 2,843,882 | 7/1958 | Lewis | 73—37.7 X |

FOREIGN PATENTS

| 1,269,743 | 7/1961 | France. |
| 307,829 | 9/1918 | Germany. |
| 231,080 | 3/1925 | Great Britain. |

ISAAC LISANN, *Primary Examiner.*

F. H. THOMSON, *Assistant Examiner.*